(12) United States Patent
Frankel et al.

(10) Patent No.: US 7,634,194 B2
(45) Date of Patent: Dec. 15, 2009

(54) MULTI-CHANNEL PROTECTION SWITCHING SYSTEMS AND METHODS FOR INCREASED RELIABILITY AND REDUCED COST

(75) Inventors: Michael Y. Frankel, Baltimore, MD (US); Balakrishnan Sridhar, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 590 days.

(21) Appl. No.: 11/446,880

(22) Filed: Jun. 5, 2006

(65) Prior Publication Data
US 2007/0280681 A1    Dec. 6, 2007

(51) Int. Cl.
*G02F 1/00* (2006.01)
*H04J 14/00* (2006.01)

(52) U.S. Cl. ............... 398/5; 398/1; 398/2; 398/3; 398/4; 398/6; 398/7; 398/9; 398/27

(58) Field of Classification Search ............... 398/1, 398/2, 3, 4, 5, 6, 7, 9, 27
See application file for complete search history.

(56) References Cited

U.S. PATENT DOCUMENTS

| 5,631,896 | A * | 5/1997 | Kawase et al. | 370/228 |
| 2001/0046344 | A1 * | 11/2001 | Hayashi et al. | 385/15 |
| 2005/0025482 | A1 * | 2/2005 | Richards et al. | 398/65 |

OTHER PUBLICATIONS

Penninckx, et al., "WDM Redundancy to counteract PMD Effects in Optical Systems", European Conference on Optical Communications, 2001.*

S. Sarkimukka, A. Djupsjobacka, A. Gavler, and G. Jacobsen; "Mitigation of Polarization-Mode Dispersion in Optical Mutlichannel Systems"; Journal of LIghtwave Technology, vol. 18, No. 10, Oct. 2000; Stockholm, Sweden.

Denis Penninckx (1), Stephanie Lanne (1), Henning Bulow (2); WDM Reduncancy to Counteract PMD Effects in Optical Systems; (1) Alcatel Research & Innovation, Route de Nozay, F-91460 Marcoussis, France (2) Alcatel Research & Innovation, Holderacker Str. 35, D-70499, Stuttgart, Germany, European Conference on Optical Communication, 2001, ECOC '01.

* cited by examiner

*Primary Examiner*—Ken N Vanderpuye
*Assistant Examiner*—Daniel G Dobson
(74) *Attorney, Agent, or Firm*—Clements Bernard PLLC; Christopher L. Bernard; Tyler S. Brown

(57) ABSTRACT

The present invention provides multi-channel protection switching systems and methods for increased reliability and reduced cost. Advantageously, the multi-channel protection switching systems and methods of the present invention use pre-FEC rate measurements, and changes in pre-FEC rate measurements, to detect and avoid potential link failures before they occur. The multi-channel protection switching systems and methods of the present invention also use "wavelength-hopping" and other protection schemes to alleviate wavelength and time-dependent optical propagation impairments. Advantageously, the multi-channel protection switching systems and methods of the present invention switch proactively on diminished, rather than failed, signals; do not require the pre-provisioning of bandwidth through an alternate physical path; allow for switching in either the electrical or optical domain; and incorporate buffering of the data sources involved such that they may be synchronized, thereby providing "hitless" switching between channel sources on the client side.

22 Claims, 6 Drawing Sheets

MULTI-CHANNEL PROTECTION SWITCHING SYSTEMS AND METHODS FOR INCREASED RELIABILITY AND REDUCED COST

FIELD OF THE INVENTION

The present invention relates generally to the telecommunications and optical networking fields. More specifically, the present invention relates to multi-channel protection switching systems and methods for increased reliability and reduced cost. Advantageously, the multi-channel protection switching systems and methods of the present invention use pre-forward error correction (pre-FEC) rate measurements, and changes in pre-FEC rate measurements, to detect and avoid potential link failures before they occur. The multi-channel protection switching systems and methods of the present invention also use "wavelength-hopping" and other protection schemes to alleviate wavelength and time-dependent optical propagation impairments.

BACKGROUND OF THE INVENTION

Optical networks are continuously evolving in order to meet ever-increasing voice and data traffic demands. There is a need for increased multi-channel capacity in wavelength division multiplexed (WDM) and dense wavelength division multiplexed (DWDM) systems, increased reliability, and reduced cost. Conventional optical networks incorporate forward error correction (FEC) in order to improve system margins and protection switching in order to improve system reliability.

FEC is a methodology whereby bits that have been improperly received, or not received at all, are detected and corrected, or replaced. Each frame of working data includes corresponding error-check data. Among other things, FEC allows a system to utilize a decreased signal-to-noise ratio (SNR), while maintaining a fixed error probability. Advantageously, a decreased SNR means that optical amplifiers may be spaced at longer distances, reducing cost, and that a faster signal may be used, for example. Disadvantageously, the inclusion of error-check data means that increased bandwidth, as well as increased transmitter and receiver complexity, are required.

Protection switching is a methodology whereby alternate optical paths, links, or channels are selected and used in response to the failure of a given optical path, link, or channel. Typically, such failures include direct failures that are detected on the receive side of the system. Protection switching is incorporated into a variety of transmission protocol standards, such as the synchronous optical network/synchronous digital hierarchy (SONET/SDH) transmission protocol standard, etc. For example, it may be required that voice or data traffic is restored within 50 ms of a direct failure.

Several conventional systems and methods use multiple working channels on a single optical link to protect against polarization mode dispersion (PMD), for example. PMD results as light travels down a single-mode fiber in two inherent polarization modes. When the core of the fiber is asymmetric, the light traveling along one polarization mode travels faster or slower than the light traveling along the other polarization mode, resulting in a pulse overlapping with others, or distorting the pulse to such a degree that it is undetectable by a receiver. PMD concerns are compounded in today's high-speed transmission optical networks. Further, PMD varies dynamically with temperature changes, infinitesimal asymmetries in the fiber core, etc., and impacts diverse wavelength channels differently. Thus, it is wavelength and time-dependent.

S. Särkimukka, A. Djupsjöbacka, A. Gavler, and G. Jacobsen ("Mitigation of Polarization-Mode Dispersion in Optical Multichannel Systems," J. Lightwave Techn., Vol. 18, No. 10, October 2000, pp. 1374-1380) disclose an approach whereby signal quality is monitored for PMD degradation and, if detected, protection switching between a failed channel and a working channel is performed. However, in the proposed system, an optical switch is disposed between the optical transmitters and an optical multiplexer (MUX). Because individual data input signals are connected to the optical transmitters, this configuration does not provide a workable solution for redirecting a specific data input signal from a failed optical transmitter to a working one. In a practical implementation, a switch must be disposed between the client input connection and the optical transmitter.

D. Penninckx, S. Lanne, and H. Bülow ("WDM Redundancy to Counteract PMD Effects in Optical Systems," European Conf. on Optical Comm., 2001) disclose an approach whereby all of the client signals are encoded with FEC, and all of the individual client data streams are bit-wise spread across all of the available optical channels in the system. On the receive end, the data streams from the optical channels are detected, re-synchronized, and bit-wise reassembled, and individual client data streams are recovered through FEC. Thus, if a few optical channels fail, these failed optical channels would affect a small fraction of the bits for all of the data signals equally. FEC allows for the recovery of the original data. This approach, however, suffers from requirements associated with complicated bit spreading and bit re-synchronization electronics. Typical FEC codes can correct on the order of 1 or fewer bits per 1000. This means that a transmission system would require 1000 channels, only 1 of which is allowed to fail at a time, which is not practical.

Conventional multi-channel systems are guaranteed to perform error-free on all channels simultaneously. As a result, such systems are limited by the performance of a worst-case channel. In optical communications, channel impairments include: amplified spontaneous emission (ASE) noise common to all erbium-doped fiber amplifiers (EDFAs) and contributing to the noise figure of the EDFAs, causing the loss of SNR; non-linear impairments, such as self-phase modulation (SPM) caused by the non-linear index of refraction of glass and its variance with optical power level, causing a frequency chirp that interacts with a fiber's dispersion to broaden a pulse, cross-phase modulation (XPM) also caused by the non-linear index of refraction of glass and its variance with optical power level, causing signals to interact, four wave mixing (FWM), common in DWDM systems, where multiple wavelengths mix together to form new wavelengths, or interfering products, that fall on the original wavelengths, becoming mixed with the signals, distorting the signals and causing degradation, etc.; chromatic dispersion (CD) caused by the fact that different colored pulses of light, with different wavelengths, travel at different speeds, even within the same mode, being the sum of material dispersion and waveguide dispersion; PMD, described above; polarization-dependent gain/loss (PDG/PDL); and the like. Further, individual channel optical transceiver (XCVR) and MUX/DEMUX performance may vary due to manufacturing tolerances and aging. Such impairments do not affect all channels equally, but, rather, present a finite statistical distribution. Thus, it is not possible to predict an individual channel performance, and system performance calculations are typically performed using worst-case scenario approximations.

Further, many of the channel impairments described above, and others, are time-dependent. For example, amplifier ripple may depend on loading, temperature, etc. PMD may depend on fiber plant conditions and polarization state. XPM and FWM may depend on polarization state of a channel and its neighbors, as well as fluctuating channel powers. The tolerance window for many of these impairments decreases significantly with increasing data rate (i.e. 40 Gb/s and above).

Disadvantageously, current protocols (i.e. SONET/SDH) protection switch on failed signals. This requires the pre-provisioning of bandwidth through an alternate physical path, which is typically implemented in a ring-like structure for SONET/SDH protection.

Thus, what are still needed in the art are multi-channel protection switching systems and methods for increased reliability and reduced cost. Preferably, the multi-channel protection switching systems and methods use pre-FEC rate measurements, and changes in pre-FEC rate measurements, to detect and avoid potential link failures before they occur. Preferably, the multi-channel protection switching systems and methods also use "wavelength-hopping" and other protection schemes to alleviate wavelength and time-dependent optical propagation impairments.

BRIEF SUMMARY OF THE INVENTION

In various exemplary embodiments, the present invention provides multi-channel protection switching systems and methods for increased reliability and reduced cost. Advantageously, the multi-channel protection switching systems and methods of the present invention use pre-FEC rate measurements, and changes in pre-FEC rate measurements, to detect and avoid potential link failures before they occur. The multi-channel protection switching systems and methods of the present invention also use "wavelength-hopping" and other protection schemes to alleviate wavelength and time-dependent optical propagation impairments. Advantageously, the multi-channel protection switching systems and methods of the present invention switch proactively on diminished, rather than failed, signals; do not require the pre-provisioning of bandwidth through an alternate physical path; allow for switching in either the electrical or optical domain; and incorporate buffering of the data sources involved such that they may be synchronized, thereby providing "hitless" switching between channel sources on the client side.

In one exemplary embodiment of the present invention, a multi-channel protection switching method for mitigating the effects of wavelength and time-dependent optical propagation impairments in an optical communications system includes monitoring a pre-forward error correction bit error rate of each of a plurality of working channels and each of a plurality of protection channels; and, if the monitored pre-forward error correction bit error rate of one of the plurality of working channels exceeds a predetermined threshold and the pre-forward error correction bit error rate of one of the plurality of protection channels does not exceed the predetermined threshold, switching traffic from said one of the plurality of working channels to said one of the plurality of protection channels. Switching the traffic from said one of the plurality of working channels to said one of the plurality of protection channels includes: forwarding a request from a receive side of the optical communications system to a transmit side of the optical communications system to switch the traffic from said one of the plurality of working channels to said one of the plurality of protection channels; switching the traffic from said one of the plurality of working channels to said one of the plurality of protection channels at the transmit side of the optical communications system; and switching the traffic from said one of the plurality of working channels to said one of the plurality of protection channels at the receive side of the optical communications system. The method also includes monitoring a post-forward error correction bit error rate of each of the plurality of working channels and each of the plurality of protection channels. Switching the traffic from said one of the plurality of working channels to said one of the plurality of protection channels occurs if the monitored pre-forward error correction bit error rate of said one of the plurality of working channels exceeds the predetermined threshold, the pre-forward error correction bit error rate of said one of the plurality of protection channels does not exceed the predetermined threshold, the monitored post-forward error correction bit error rate of said one of the plurality of working channels is zero, and the monitored post-forward error correction bit error rate of said one of the plurality of protection channels is zero. If the monitored pre-forward error correction bit error rate of one of the plurality of working channels does not exceed the predetermined threshold, the traffic is maintained on said one of the plurality of working channels. The method further includes buffering data while switching the traffic from said one of the plurality of working channels to said one of the plurality of protection channels. Finally, switching the traffic from said one of the plurality of working channels to said one of the plurality of protection channels comprises switching the traffic from said one of the plurality of working channels to said one of the plurality of protection channels in an electrical domain.

In another exemplary embodiment of the present invention, a multi-channel protection tuning method for mitigating the effects of wavelength and time-dependent optical propagation impairments in an optical communications system includes monitoring a pre-forward error correction bit error rate of each of a plurality of wavelength slots; and, if the monitored pre-forward error correction bit error rate of one of the plurality of wavelength slots exceeds a predetermined threshold and the pre-forward error correction bit error rate of one of the plurality of wavelength slots does not exceed the predetermined threshold, tuning traffic from said exceeding one of the plurality of wavelength slots to said not exceeding one of the plurality of wavelength slots. Tuning the traffic from said exceeding one of the plurality of wavelength slots to said not exceeding one of the plurality of wavelength slots includes: forwarding a request from a receive side of the optical communications system to a transmit side of the optical communications system to tune the traffic from said exceeding one of the plurality of wavelength slots to said not exceeding one of the plurality of wavelength slots; tuning the traffic from said exceeding one of the plurality of wavelength slots to said not exceeding one of the plurality of wavelength slots at the transmit side of the optical communications system; and tuning the traffic from said exceeding one of the plurality of wavelength slots to said not exceeding one of the plurality of wavelength slots at the receive side of the optical communications system. The method also includes monitoring a post-forward error correction bit error rate of each of the plurality of wavelength slots. Tuning the traffic from said exceeding one of the plurality of wavelength slots to said not exceeding one of the plurality of wavelength slots occurs if the monitored pre-forward error correction bit error rate of said exceeding one of the plurality of wavelength slots exceeds the predetermined threshold, the pre-forward error correction bit error rate of said not exceeding one of the plurality of wavelength slots does not exceed the predetermined threshold, the monitored post-forward error correction bit error rate of said exceeding one of the plurality of wavelength slots is zero, and the monitored post-forward error correction bit error rate of said not exceeding one of the plurality of wavelength slots is zero. If the monitored pre-forward error correction bit error rate of one of the plurality of wavelength slots does not exceed the predetermined threshold, the traffic is maintained on said one of the plurality of wavelength slots. Finally, tuning the traffic from said exceeding one of the plurality of wavelength slots to said not exceeding one of the plurality of wavelength slots comprises tuning the traffic from said exceeding one of the plurality of wavelength slots to said not exceeding one of the plurality of wavelength slots in an optical domain.

In a further exemplary embodiment of the present invention, a multi-channel protection switching system for mitigating the effects of wavelength and time-dependent optical propagation impairments in an optical communications system includes a monitor for monitoring a pre-forward error correction bit error rate of each of a plurality of working channels and each of a plurality of protection channels; and a switching mechanism for, if the monitored pre-forward error correction bit error rate of one of the plurality of working channels exceeds a predetermined threshold and the pre-forward error correction bit error rate of one of the plurality of protection channels does not exceed the predetermined threshold, switching traffic from said one of the plurality of working channels to said one of the plurality of protection channels. The switching mechanism for switching the traffic from said one of the plurality of working channels to said one of the plurality of protection channels includes: a communication mechanism for forwarding a request from a receive side of the optical communications system to a transmit side of the optical communications system to switch the traffic from said one of the plurality of working channels to said one of the plurality of protection channels; a transmit side switching mechanism for switching the traffic from said one of the plurality of working channels to said one of the plurality of protection channels at the transmit side of the optical communications system; and a receive side switching mechanism for switching the traffic from said one of the plurality of working channels to said one of the plurality of protection channels at the receive side of the optical communications system. The system also includes a monitor for monitoring a post-forward error correction bit error rate of each of the plurality of working channels and each of the plurality of protection channels. Switching the traffic from said one of the plurality of working channels to said one of the plurality of protection channels occurs if the monitored pre-forward error correction bit error rate of said one of the plurality of working channels exceeds the predetermined threshold, the pre-forward error correction bit error rate of said one of the plurality of protection channels does not exceed the predetermined threshold, the monitored post-forward error correction bit error rate of said one of the plurality of working channels is zero, and the monitored post-forward error correction bit error rate of said one of the plurality of protection channels is zero. If the monitored pre-forward error correction bit error rate of one of the plurality of working channels does not exceed the predetermined threshold, the traffic is maintained on said one of the plurality of working channels. The system further includes a data buffer for buffering data while switching the traffic from said one of the plurality of working channels to said one of the plurality of protection channels. Finally, switching the traffic from said one of the plurality of working channels to said one of the plurality of protection channels comprises switching the traffic from said one of the plurality of working channels to said one of the plurality of protection channels in an electrical domain.

In a still further exemplary embodiment of the present invention, a multi-channel protection tuning system for mitigating the effects of wavelength and time-dependent optical propagation impairments in an optical communications system includes a monitor for monitoring a pre-forward error correction bit error rate of each of a plurality of wavelength slots; and a tuning mechanism for, if the monitored pre-forward error correction bit error rate of one of the plurality of wavelength slots exceeds a predetermined threshold and the pre-forward error correction bit error rate of one of the plurality of wavelength slots does not exceed the predetermined threshold, tuning traffic from said exceeding one of the plurality of wavelength slots to said not exceeding one of the plurality of wavelength slots. The tuning mechanism for tuning the traffic from said exceeding one of the plurality of wavelength slots to said not exceeding one of the plurality of wavelength slots includes: a communication mechanism for forwarding a request from a receive side of the optical communications system to a transmit side of the optical communications system to tune the traffic from said exceeding one of the plurality of wavelength slots to said not exceeding one of the plurality of wavelength slots; a transmit side tuning mechanism for tuning the traffic from said exceeding one of the plurality of wavelength slots to said not exceeding one of the plurality of wavelength slots at the transmit side of the optical communications system; and a receive side tuning mechanism for tuning the traffic from said exceeding one of the plurality of wavelength slots to said not exceeding one of the plurality of wavelength slots at the receive side of the optical communications system. The system also includes a monitor for monitoring a post-forward error correction bit error rate of each of the plurality of wavelength slots. Tuning the traffic from said exceeding one of the plurality of wavelength slots to said not exceeding one of the plurality of wavelength slots occurs if the monitored pre-forward error correction bit error rate of said exceeding one of the plurality of wavelength slots exceeds the predetermined threshold, the pre-forward error correction bit error rate of said not exceeding one of the plurality of wavelength slots does not exceed the predetermined threshold, the monitored post-forward error correction bit error rate of said exceeding one of the plurality of wavelength slots is zero, and the monitored post-forward error correction bit error rate of said not exceeding one of the plurality of wavelength slots is zero. If the monitored pre-forward error correction bit error rate of one of the plurality of wavelength slots does not exceed the predetermined threshold, the traffic is maintained on said one of the plurality of wavelength slots. Finally, tuning the traffic from said exceeding one of the plurality of wavelength slots to said not exceeding one of the plurality of wavelength slots comprises tuning the traffic from said exceeding one of the plurality of wavelength slots to said not exceeding one of the plurality of wavelength slots in an optical domain.

BRIEF DESCRIPTION OF THE DRAWINGS

The present invention is illustrated and described herein with reference to the various drawings, in which like reference numbers denote like system components and/or method steps, as appropriate, and in which.

DETAILED DESCRIPTION OF THE INVENTION

In various exemplary embodiments, the present invention provides multi-channel protection switching systems and methods for increased reliability and reduced cost. Advantageously, the multi-channel protection switching systems and methods of the present invention use pre-FEC rate measurements, and changes in pre-FEC rate measurements, to detect and avoid potential link failures before they occur. The multi-channel protection switching systems and methods of the present invention also use "wavelength-hopping" and other protection schemes to alleviate wavelength and time-dependent optical propagation impairments. Advantageously, the multi-channel protection switching systems and methods of the present invention switch proactively on diminished, rather than failed, signals; do not require the pre-provisioning of bandwidth through an alternate physical path; allow for switching in either the electrical or optical domain; and incorporate buffering of the data sources involved such that they may be synchronized, thereby providing "hitless" switching between channel sources on the client side.

Figure 1:
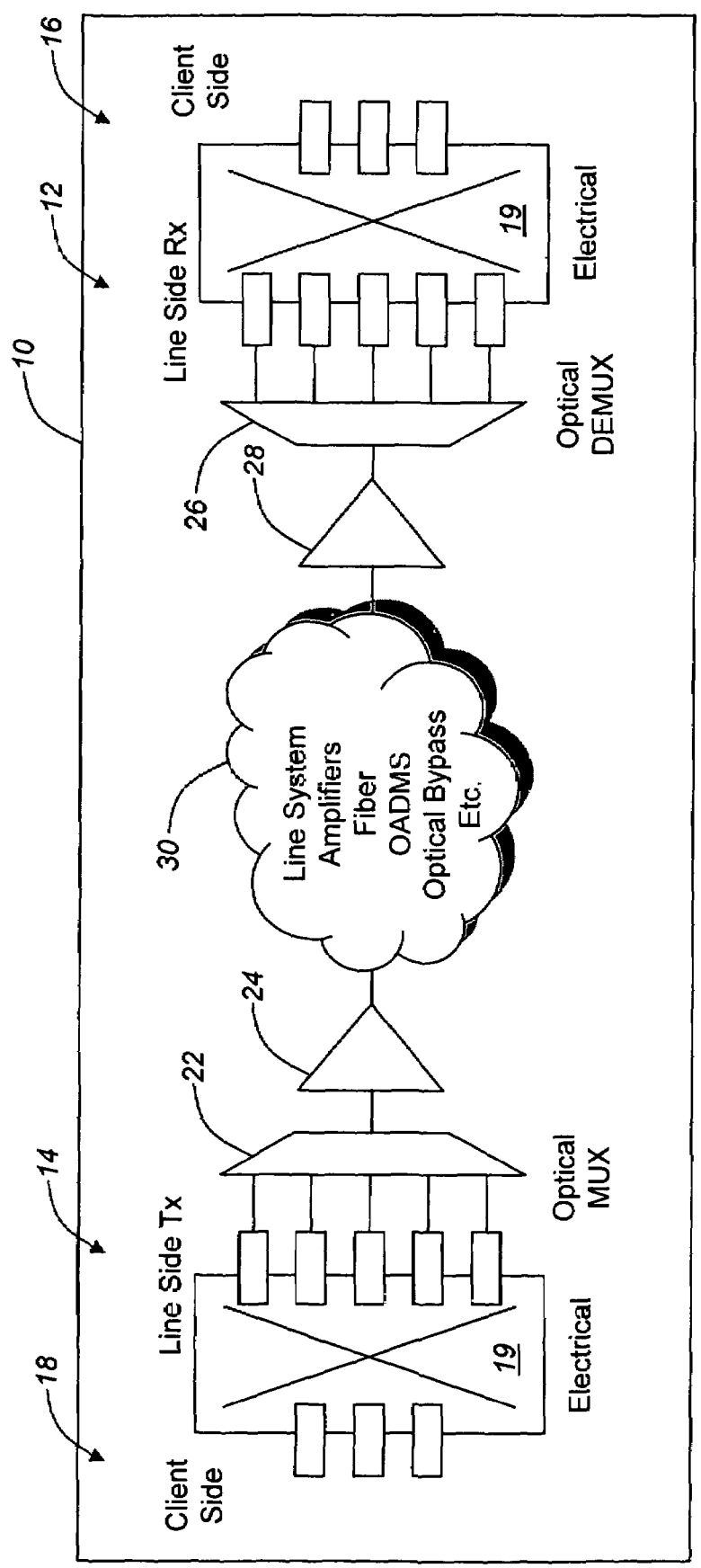
FIG. 1 is a schematic diagram illustrating one exemplary embodiment of the multi-channel protection switching system of the present invention, wherein the multi-channel protection switching system is especially useful for protecting against time-dependent channel impairments, such as PMD and PDG/PDL, in a WDM environment.

Referring to FIG. 1, in one exemplary embodiment of the present invention, a multi-channel protection switching system 10 for increased reliability and reduced cost is especially useful for protecting against time-dependent channel impairments, such as PMD and PDG/PDL, in a WDM environment. This multi-channel protection switching system 10 provides a relatively fast protection mechanism, limited only by the receiver (Rx) 12 to transmitter (Tx) 14 propagation delay. The multi-channel protection switching system 10 requires the over-provisioning of the number of channels (bandwidth), with a corresponding increase in XCVR count.

Figure 2:
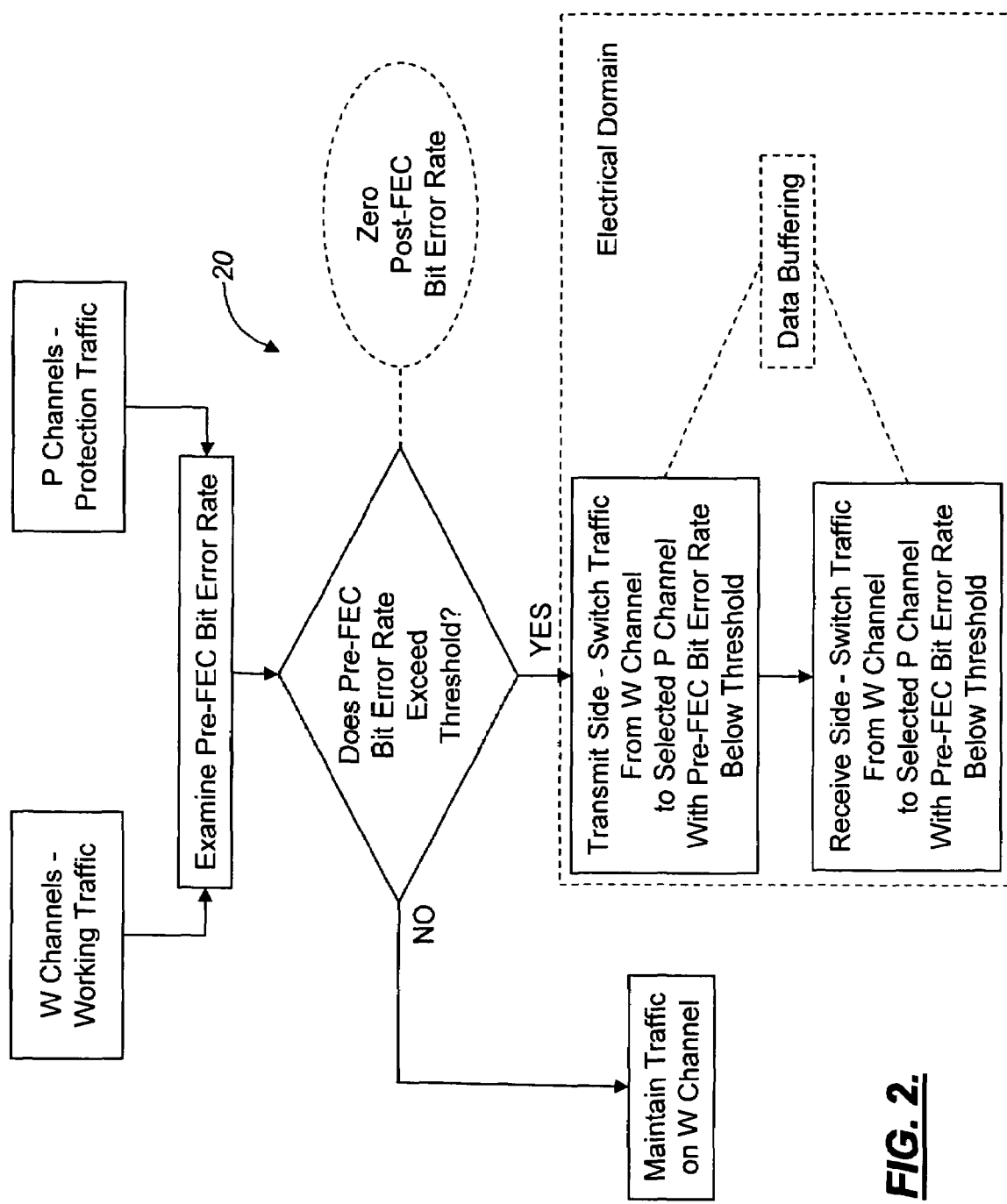
FIG. 2 is a flowchart illustrating one exemplary embodiment of the methodology associated with the multi-channel protection switching system of FIG. 1.

W channels are assumed to carry working traffic, and P channels are assumed to be reserved for protection traffic. A monitor (not shown) continuously examines the pre-FEC bit error rate on each W and P channel, and determines the transmission quality, or signal quality (QoS), of all W and P channels. Such bit error rate monitoring is inherently present in FEC circuit implementation, as the number of corrected "1" and "0" bits is known. When the pre-FEC bit error rate on a given W channel increases above a predetermined threshold, while still providing a zero post-forward error correction (post-FEC) bit error rate, a request is forwarded from the receive side 16 to the transmit side 18 to switch the traffic from the W channel to one of the P channels, which still has an associated pre-FEC bit error rate that is below the predetermined threshold. The threshold level needs to be set below typical FEC code bit error rate correction capability of 0.001, and can be set at 0.0001, for example. A corresponding switch from the W channel to the selected P channel is performed on the receive side 16 to complete the new connection. Preferably, this switching is performed in the electrical domain 19. With sufficient buffering, the two data sources are synchronized such that the switching is "hitless" to the client(s). The methodology 20 described above is illustrated in FIG. 2.

Referring again to FIG. 1, it should be noted that the transmit side 18 incorporates a MUX 22 and, optionally, an optical amplifier 24, in addition to the line side Txs 14, etc. Likewise, it should be noted that the receive side 16 incorporates a DEMUX 26 and, optionally, another optical amplifier 28, in addition to the line side Rxs 12, etc. Disposed between the transmit side 18 and the receive side 16 are a line system, further optical amplifiers, fiber, optical add/drop multiplexers (OADMs), an optical bypass, etc., collectively forming a conventional optical transport network (OTN) 30.

Figure 3:
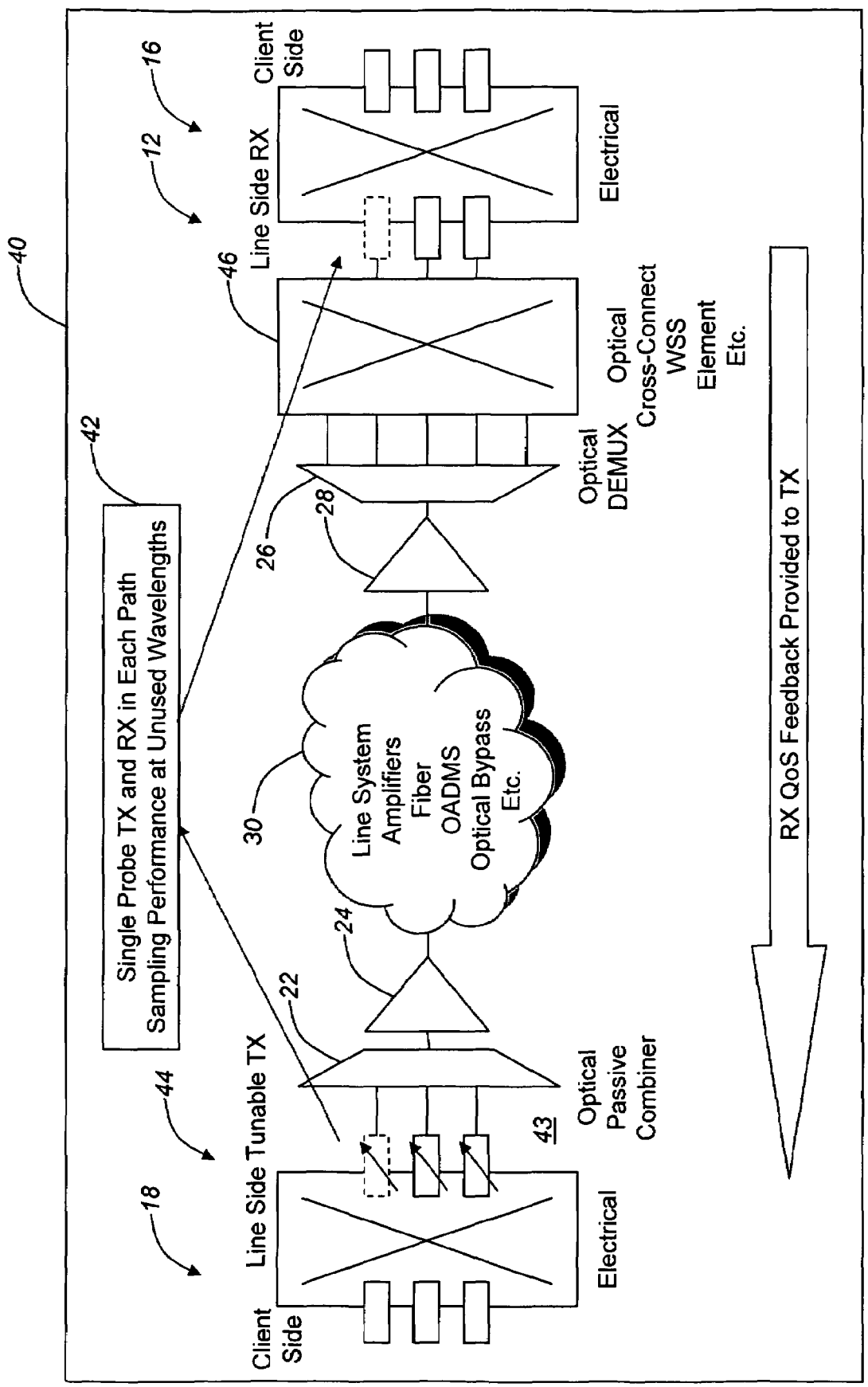
FIG. 3 is a schematic diagram illustrating another exemplary embodiment of the multi-channel protection switching system of the present invention, wherein the multi-channel protection switching system is especially useful for the in-service characterization of a transmission line in a WDM environment.

Referring to FIG. 3, in another exemplary embodiment of the present invention, a multi-channel protection switching system 40 for increased reliability and reduced cost is especially useful for the in-service characterization of a transmission line in a WDM environment. This multi-channel protection switching system 40 provides a somewhat slower protection mechanism, limited by the tunable speed of the probe XCVR 42 used, but conserves XCVR hardware. The multi-channel protection switching system 40 does not require the over-provisioning of the number of channels (bandwidth). In general, the multi-channel protection switching system 40 uses a wavelength-tunable Tx 44 approach for each of the channels.

Figure 4:
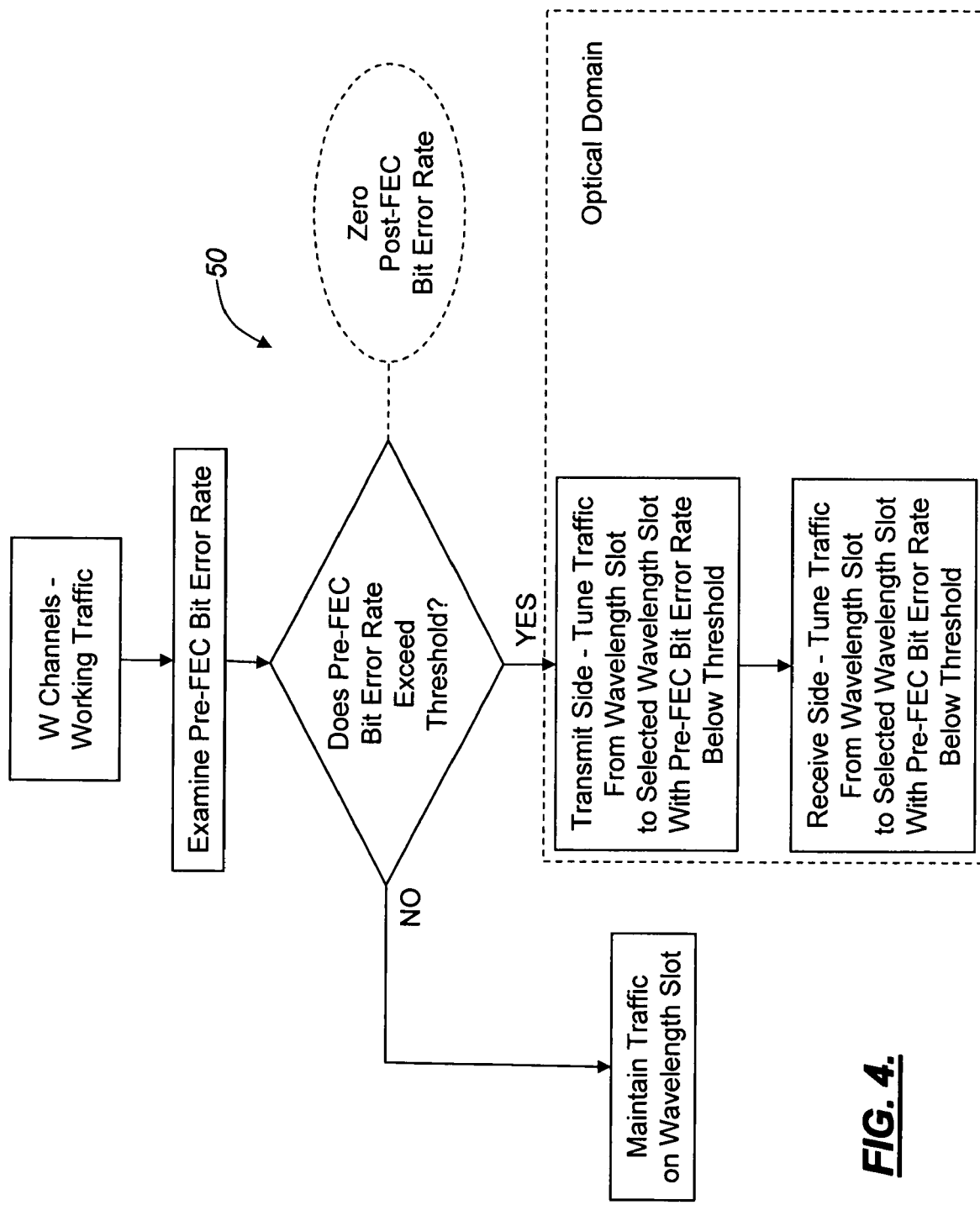
FIG. 4 is a flowchart illustrating one exemplary embodiment of the methodology associated with the multi-channel protection switching system of FIG. 3.

W channels are assumed to carry working traffic. A separate test channel continuously scans the spectrum of available (i.e. unoccupied) wavelength slots and measures their performance, or QoS. With a proper architecture, each available wavelength slot may be probed within about 10 ms. When the pre-FEC bit error rate on a given W channel increases above a predetermined threshold, while still providing a zero post-FEC bit error rate, a request is forwarded from the receive side 16 to the transmit side 18 to tune the wavelength to one of the available wavelength slots, which still has an associated pre-FEC bit error rate that is below the predetermined threshold. The threshold level needs to be set below typical FEC code bit error rate correction capability of 0.001, and can be set at 0.0001, for example. A corresponding wavelength tuning is performed on the receive side 16 to complete the new connection. Preferably, this tuning is performed in the optical domain 43. The methodology 50 described above is illustrated in FIG. 4.

Referring again to FIG. 3, it should be noted that the transmit side 18 incorporates a MUX 22 and, optionally, an optical amplifier 24, in addition to the line side tunable Txs 44, etc. Likewise, it should be noted that the receive side 16 incorporates a DEMUX 26, optionally, another optical amplifier 28, and an optical cross-connect (XC) 46, in addition to the line side Rxs 12, etc. Disposed between the transmit side 18 and the receive side 16 are a line system, further optical amplifiers, fiber, OADMs, an optical bypass, etc., collectively forming a conventional OTN 30. This exemplary embodiment of the multi-channel protection switching system 40 is more useful for OTNs 30 that include OADMs and multiple associated optical paths. Rather than over-provisioning the bandwidth on each of the optical paths, a single probe XCVR 42 per traffic generating node is sufficient, along with synchronous control of OADM path provisioning during the scanning cycle. Thus, an optical path connection can be established dynamically between any pair of traffic-generating nodes, and at any arbitrary wavelength, thereby allowing a measurement of the network transmission characteristics with a minimum of additional hardware and cost.

Figure 5:
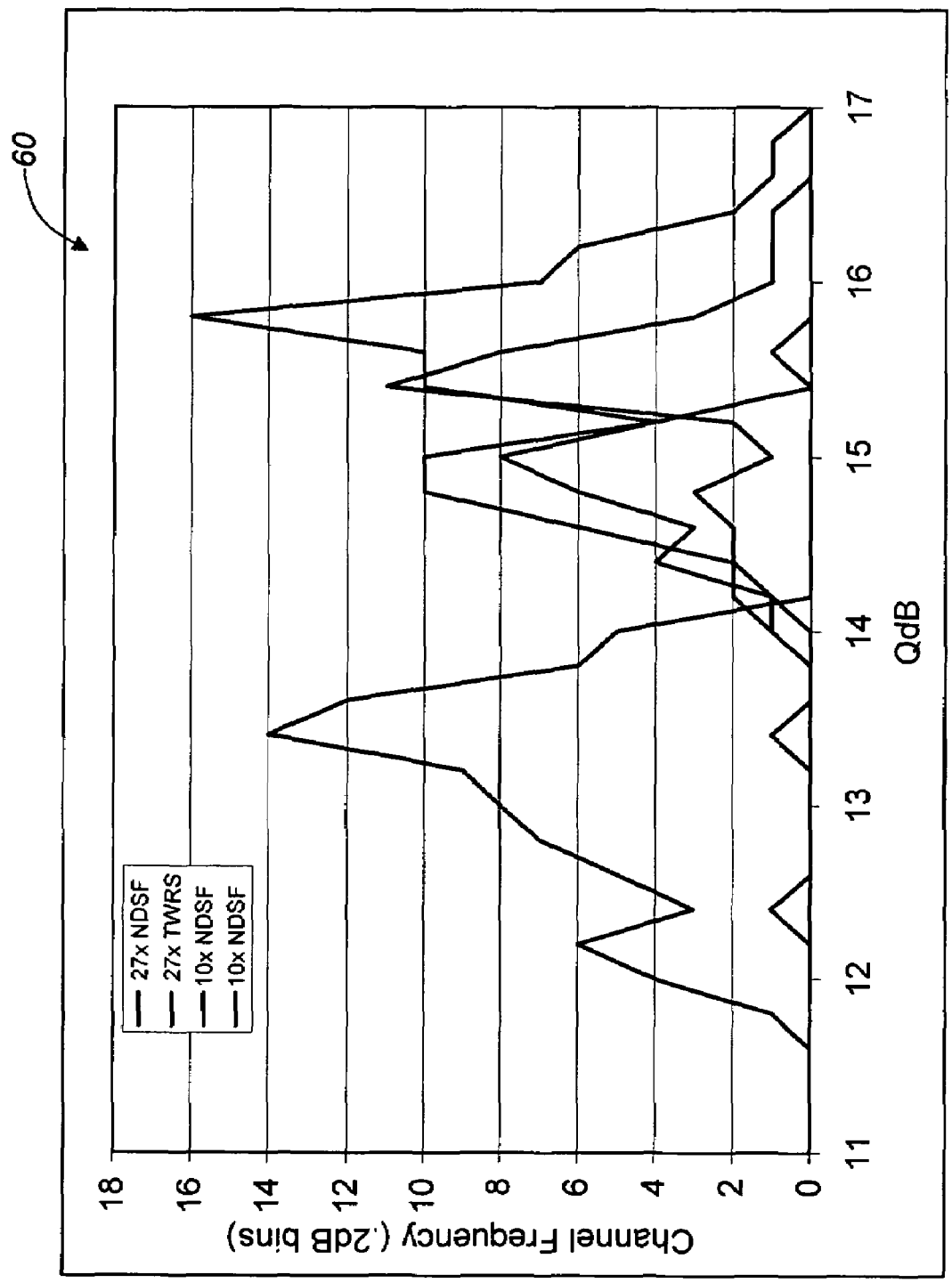
FIG. 5 is a plot illustrating the Quality (Q)-factor distributions for several typical multi-channel DWDM systems.
Figure 6:
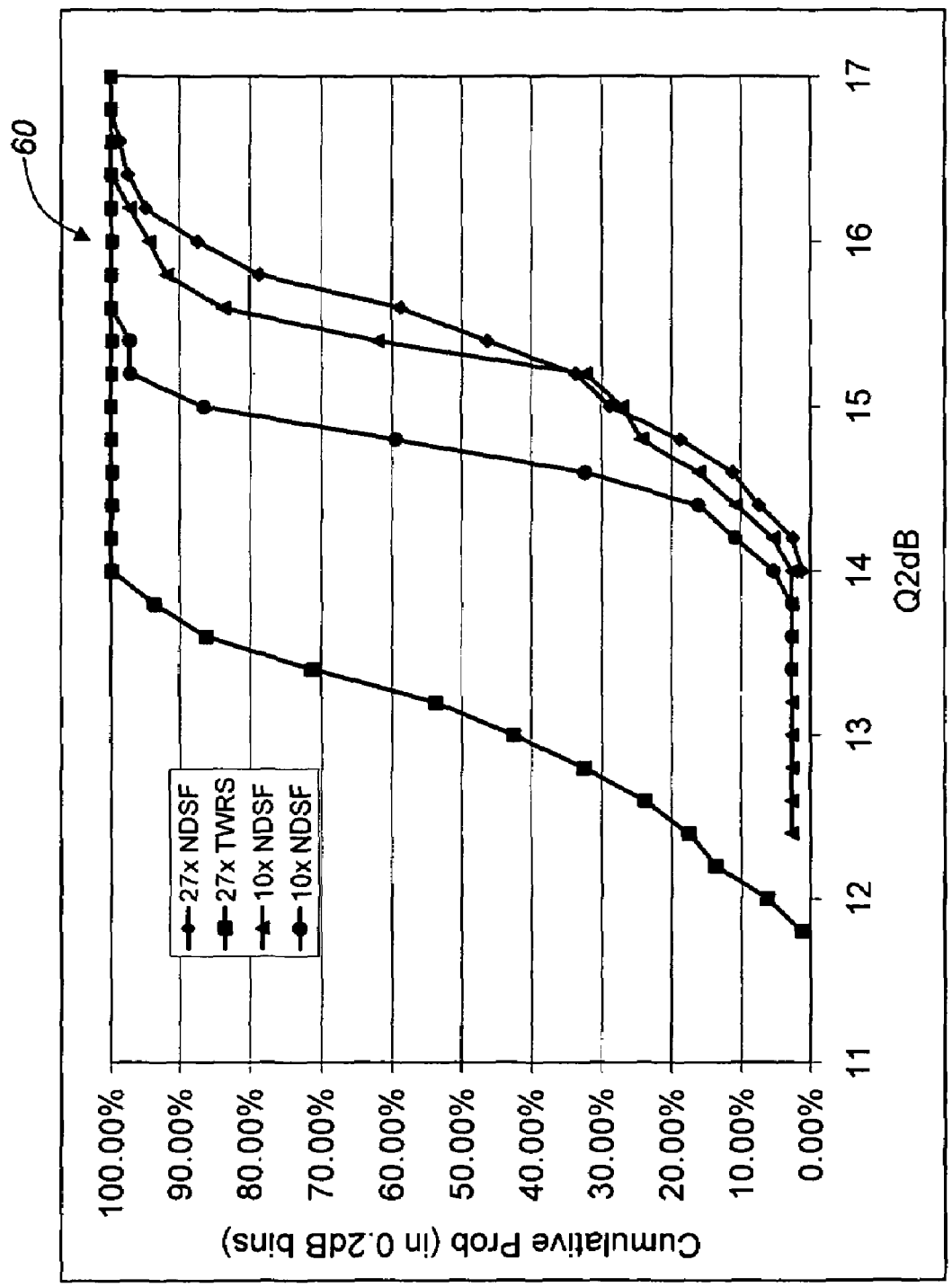
FIG. 6 is a plot illustrating the Q-factor distributions for the multi-channel DWDM systems of FIG. 5, expressed as cumulative probability functions.

FIG. 5 illustrates the Q-factor distributions 60 for several typical multi-channel DWDM systems. As is illustrated, only a few channels demonstrate worst-case performance characteristics, corresponding to the lowest Q-factors. FIG. 6 illustrates the Q-factor distributions 60 for the multi-channel DWDM systems of FIG. 5, expressed as cumulative probability functions. It should be noted that, while such Q-factor distributions may be measured, it is not possible to actually predict which specific channels will demonstrate worst-case performance characteristics in a deployed system. Further, each channel's performance varies over time, thus the channels that demonstrate worst-case performance characteristics change over time. Typical conventional attempts to improve system performance utilize tight control of component and subcomponent tolerances, and tight control of system operation. However, as advantageously proposed herein, overall system margins may be improved by over-provisioning bandwidth. For example, based on the cumulative probability functions illustrated, it is possible to improve system margins by an effective 1 dB in $Q^2$ db if about 20% of the provisioned bandwidth is allocated. Overall system costs may be reduced by relaxing component and subcomponent tolerances, thereby allowing increased performance distribution spread, while still maintaining overall system margins.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A multi-channel protection switching method for mitigating the effects of wavelength and time-dependent optical propagation impairments in an optical communications system, the multi-channel protection switching method comprising:
    monitoring a pre-forward error correction bit error rate of each of a plurality of working channels and each of a plurality of protection channels;
    if the monitored pre-forward error correction bit error rate of one of the plurality of working channels exceeds a predetermined threshold and the pre-forward error correction bit error rate of one of the plurality of protection channels does not exceed the predetermined threshold, switching traffic from said one of the plurality of working channels to said one of the plurality of protection channels; and
    monitoring a post-forward error correction bit error rate of each of the plurality of working channels and each of the plurality of protection channels;
    wherein switching the traffic from said one of the plurality of working channels to said one of the plurality of protection channels occurs if the monitored pre-forward error correction bit error rate of said one of the plurality of working channels exceeds the predetermined threshold, the pre-forward error correction bit error rate of said one of the plurality of protection channels does not exceed the predetermined threshold, and the monitored post-forward error correction bit error rate of said one of the plurality of working channels is zero.

2. The multi-channel protection switching method of claim 1, wherein switching the traffic from said one of the plurality of working channels to said one of the plurality of protection channels comprises:
    forwarding a request from a receive side of the optical communications system to a transmit side of the optical communications system to switch the traffic from said one of the plurality of working channels to said one of the plurality of protection channels;
    switching the traffic from said one of the plurality of working channels to said one of the plurality of protection channels at the transmit side of the optical communications system; and
    switching the traffic from said one of the plurality of working channels to said one of the plurality of protection channels at the receive side of the optical communications system.

3. The multi-channel protection switching method of claim 1, wherein switching the traffic from said one of the plurality of working channels to said one of the plurality of protection channels occurs if the monitored pre-forward error correction bit error rate of said one of the plurality of working channels exceeds the predetermined threshold, the pre-forward error correction bit error rate of said one of the plurality of protection channels does not exceed the predetermined threshold, the monitored post-forward error correction bit error rate of said one of the plurality of working channels is zero, and the monitored post-forward error correction bit error rate of said one of the plurality of protection channels is zero.

4. The multi-channel protection switching method of claim 1, further comprising, if the monitored pre-forward error correction bit error rate of one of the plurality of working channels does not exceed the predetermined threshold, maintaining the traffic on said one of the plurality of working channels.

5. The multi-channel protection switching method of claim 1, further comprising buffering data while switching the traffic from said one of the plurality of working channels to said one of the plurality of protection channels.

6. The multi-channel protection switching method of claim 1, wherein switching the traffic from said one of the plurality of working channels to said one of the plurality of protection channels comprises switching the traffic from said one of the plurality of working channels to said one of the plurality of protection channels in an electrical domain.

7. A multi-channel protection tuning method for mitigating the effects of wavelength and time-dependent optical propagation impairments in an optical communications system, the multi-channel protection tuning method comprising:
    monitoring a pre-forward error correction bit error rate of each of a plurality of wavelength slots;
    if the monitored pre-forward error correction bit error rate of one of the plurality of wavelength slots exceeds a predetermined threshold and the pre-forward error correction bit error rate of one of the plurality of wavelength slots does not exceed the predetermined threshold, tuning traffic from said exceeding one of the plurality of wavelength slots to said not exceeding one of the plurality of wavelength slots;
    monitoring a post-forward error correction bit error rate of each of the plurality of wavelength slots;
    wherein tuning the traffic from said exceeding one of the plurality of wavelength slots to said not exceeding one of the plurality of wavelength slots occurs if the monitored pre-forward error correction bit error rate of said exceeding one of the plurality of wavelength slots exceeds the predetermined threshold, the pre-forward error correction bit error rate of said not exceeding one of the plurality of wavelength slots does not exceed the predetermined threshold, and the monitored post-forward error correction bit error rate of said exceeding one of the plurality of wavelength slots is zero.

8. The multi-channel protection tuning method of claim 7, wherein tuning the traffic from said exceeding one of the plurality of wavelength slots to said not exceeding one of the plurality of wavelength slots comprises:
   forwarding a request from a receive side of the optical communications system to a transmit side of the optical communications system to tune the traffic from said exceeding one of the plurality of wavelength slots to said not exceeding one of the plurality of wavelength slots;
   tuning the traffic from said exceeding one of the plurality of wavelength slots to said not exceeding one of the plurality of wavelength slots at the transmit side of the optical communications system; and
   tuning the traffic from said exceeding one of the plurality of wavelength slots to said not exceeding one of the plurality of wavelength slots at the receive side of the optical communications system.

9. The multi-channel protection tuning method of claim 7, wherein tuning the traffic from said exceeding one of the plurality of wavelength slots to said not exceeding one of the plurality of wavelength slots occurs if the monitored pre-forward error correction bit error rate of said exceeding one of the plurality of wavelength slots exceeds the predetermined threshold, the pre-forward error correction bit error rate of said not exceeding one of the plurality of wavelength slots does not exceed the predetermined threshold, the monitored post-forward error correction bit error rate of said exceeding one of the plurality of wavelength slots is zero, and the monitored post-forward error correction bit error rate of said not exceeding one of the plurality of wavelength slots is zero.

10. The multi-channel protection tuning method of claim 7, further comprising, if the monitored pre-forward error correction bit error rate of one of the plurality of wavelength slots does not exceed the predetermined threshold, maintaining the traffic on said one of the plurality of wavelength slots.

11. The multi-channel protection tuning method of claim 7, wherein tuning the traffic from said exceeding one of the plurality of wavelength slots to said not exceeding one of the plurality of wavelength slots comprises tuning the traffic from said exceeding one of the plurality of wavelength slots to said not exceeding one of the plurality of wavelength slots in an optical domain.

12. A multi-channel protection switching system for mitigating the effects of wavelength and time-dependent optical propagation impairments in an optical communications system, the multi-channel protection switching system comprising:
   a monitor for monitoring a pre-forward error correction bit error rate of each of a plurality of working channels and each of a plurality of protection channels;
   a switching mechanism for, if the monitored pre-forward error correction bit error rate of one of the plurality of working channels exceeds a predetermined threshold and the pre-forward error correction bit error rate of one of the plurality of protection channels does not exceed the predetermined threshold, switching traffic from said one of the plurality of working channels to said one of the plurality of protection channels and
   a monitor for monitoring a post-forward error correction bit error rate of each of the plurality of working channels and each of the plurality of protection channels;
   wherein switching the traffic from said one of the plurality of working channels to said one of the plurality of protection channels occurs if the monitored pre-forward error correction bit error rate of said one of the plurality of working channels exceeds the predetermined threshold, the pre-forward error correction bit error rate of said one of the plurality of protection channels does not exceed the predetermined threshold, and the monitored post-forward error correction bit error rate of said one of the plurality of working channels is zero.

13. The multi-channel protection switching system of claim 12, wherein the switching mechanism for switching the traffic from said one of the plurality of working channels to said one of the plurality of protection channels comprises:
   a communication mechanism for forwarding a request from a receive side of the optical communications system to a transmit side of the optical communications system to switch the traffic from said one of the plurality of working channels to said one of the plurality of protection channels;
   a transmit side switching mechanism for switching the traffic from said one of the plurality of working channels to said one of the plurality of protection channels at the transmit side of the optical communications system; and
   a receive side switching mechanism for switching the traffic from said one of the plurality of working channels to said one of the plurality of protection channels at the receive side of the optical communications system.

14. The multi-channel protection switching system of claim 12, wherein switching the traffic from said one of the plurality of working channels to said one of the plurality of protection channels occurs if the monitored pre-forward error correction bit error rate of said one of the plurality of working channels exceeds the predetermined threshold, the pre-forward error correction bit error rate of said one of the plurality of protection channels does not exceed the predetermined threshold, the monitored post-forward error correction bit error rate of said one of the plurality of working channels is zero, and the monitored post-forward error correction bit error rate of said one of the plurality of protection channels is zero.

15. The multi-channel protection switching system of claim 12, further comprising, if the monitored pre-forward error correction bit error rate of one of the plurality of working channels does not exceed the predetermined threshold, maintaining the traffic on said one of the plurality of working channels.

16. The multi-channel protection switching system of claim 12, further comprising a data buffer for buffering data while switching the traffic from said one of the plurality of working channels to said one of the plurality of protection channels.

17. The multi-channel protection switching system of claim 12, wherein switching the traffic from said one of the plurality of working channels to said one of the plurality of protection channels comprises switching the traffic from said one of the plurality of working channels to said one of the plurality of protection channels in an electrical domain.

18. A multi-channel protection tuning system for mitigating the effects of wavelength and time-dependent optical propagation impairments in an optical communications system, the multi-channel protection tuning system comprising:
   a monitor for monitoring a pre-forward error correction bit error rate of each of a plurality of wavelength slots;
   a tuning mechanism for, if the monitored pre-forward error correction bit error rate of one of the plurality of wavelength slots exceeds a predetermined threshold and the pre-forward error correction bit error rate of one of the plurality of wavelength slots does not exceed the predetermined threshold, tuning traffic from said exceeding one of the plurality of wavelength slots to said not exceeding one of the plurality of wavelength slots; and a monitor for monitoring a post-forward error correction bit error rate of each of the plurality of wavelength slots;

wherein tuning the traffic from said exceeding one of the plurality of wavelength slots to said not exceeding one of the plurality of wavelength slots occurs if the monitored pre-forward error correction bit error rate of said exceeding one of the plurality of wavelength slots exceeds the predetermined threshold, the pre-forward error correction bit error rate of said not exceeding one of the plurality of wavelength slots does not exceed the predetermined threshold, and the monitored post-forward error correction bit error rate of said exceeding one of the plurality of wavelength slots is zero.

19. The multi-channel protection tuning system of claim 18, wherein the tuning mechanism for tuning the traffic from said exceeding one of the plurality of wavelength slots to said not exceeding one of the plurality of wavelength slots comprises:

a communication mechanism for forwarding a request from a receive side of the optical communications system to a transmit side of the optical communications system to tune the traffic from said exceeding one of the plurality of wavelength slots to said not exceeding one of the plurality of wavelength slots;

a transmit side tuning mechanism for tuning the traffic from said exceeding one of the plurality of wavelength slots to said not exceeding one of the plurality of wavelength slots at the transmit side of the optical communications system; and a receive side tuning mechanism for tuning the traffic from said exceeding one of the plurality of wavelength slots to said not exceeding one of the plurality of wavelength slots at the receive side of the optical communications system.

20. The multi-channel protection tuning system of claim 18, wherein tuning the traffic from said exceeding one of the plurality of wavelength slots to said not exceeding one of the plurality of wavelength slots occurs if the monitored pre-forward error correction bit error rate of said exceeding one of the plurality of wavelength slots exceeds the predetermined threshold, the pre-forward error correction bit error rate of said not exceeding one of the plurality of wavelength slots does not exceed the predetermined threshold, the monitored post-forward error correction bit error rate of said exceeding one of the plurality of wavelength slots is zero, and the monitored post-forward error correction bit error rate of said not exceeding one of the plurality of wavelength slots is zero.

21. The multi-channel protection tuning system of claim 18, further comprising, if the monitored pre-forward error correction bit error rate of one of the plurality of wavelength slots does not exceed the predetermined threshold, maintaining the traffic on said one of the plurality of wavelength slots.

22. The multi-channel protection tuning system of claim 18, wherein tuning the traffic from said exceeding one of the plurality of wavelength slots to said not exceeding one of the plurality of wavelength slots comprises tuning the traffic from said exceeding one of the plurality of wavelength slots to said not exceeding one of the plurality of wavelength slots in an optical domain.

* * * * *